United States Patent
Cader et al.

(10) Patent No.: US 12,529,625 B2
(45) Date of Patent: Jan. 20, 2026

(54) IMPROVING DATA MONITORING AND QUALITY USING AI AND MACHINE LEARNING

(71) Applicant: HEWLETT PACKARD ENTERPRISE DEVELOPMENT LP, Houston, TX (US)

(72) Inventors: Tahir Cader, Liberty Lake, WA (US); Sergey Serebryakov, Milpitas, CA (US); Torsten Wilde, Berlin (DE); Jeff Hanson, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 304 days.

(21) Appl. No.: 17/351,085

(22) Filed: Jun. 17, 2021

(65) Prior Publication Data

US 2022/0404235 A1 Dec. 22, 2022

(51) Int. Cl.
*G06N 20/00* (2019.01)
*G01D 3/08* (2006.01)
*G01M 99/00* (2011.01)

(52) U.S. Cl.
CPC ............ *G01M 99/005* (2013.01); *G01D 3/08* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,620,613 | B1* | 11/2009 | Moore | H05K 7/20836 706/14 |
| 2010/0332011 | A1* | 12/2010 | Venugopal | H01J 37/32935 700/109 |
| 2016/0162382 | A1* | 6/2016 | Devin | G06F 11/3433 702/186 |
| 2016/0364467 | A1* | 12/2016 | Gupta | G06F 16/285 |
| 2019/0208660 | A1* | 7/2019 | Agrawal | E04H 5/00 |

(Continued)

FOREIGN PATENT DOCUMENTS

| | | | | | |
|---|---|---|---|---|---|
| CN | 112188531 | * | 1/2021 | | H04L 43/16 |
| CN | 112188531 | A * | 1/2021 | | H04L 43/16 |

OTHER PUBLICATIONS

Tom Lish, "What Can Affect A Sensor's Accuracy?" Sep. 19, 2016 downloaded from https://www.setra.com/blog/what-can-reduce-a-sensors-accuracy (Year: 2016).*

*Primary Examiner* — Michael J Dalbo
*Assistant Examiner* — Denise R Karavias
(74) *Attorney, Agent, or Firm* — Sheppard Mullin Richter & Hampton LLP

(57) ABSTRACT

Systems and methods are provided for improving statistical and machine learning drift detection models that monitor computing health of a data center environment. For example, the system can receive streams of sensor data from a plurality of sensors in a data center; clean the streams of sensor data; generate, using a machine learning (ML) model, an anomaly score and a dynamic threshold value based on the cleaned streams of sensor data; determine, using the ML model and based on the anomaly score and the dynamic threshold value, a correctness indicator for a first sensor in the plurality of sensors; and using the correctness indicator, correct the first sensor.

21 Claims, 6 Drawing Sheets

(56) References Cited

U.S. PATENT DOCUMENTS

| | | | |
|---|---|---|---|
| 2020/0041316 A1* | 2/2020 | Parush Tzur | G01K 15/007 |
| 2020/0351171 A1* | 11/2020 | Ozonat | H04L 41/16 |
| 2020/0379454 A1* | 12/2020 | Trinh | G06N 3/088 |
| 2021/0019397 A1* | 1/2021 | Lemberg | G06F 11/3466 |
| 2022/0284330 A1* | 9/2022 | Ambrus | E21B 44/00 |

* cited by examiner

IMPROVING DATA MONITORING AND QUALITY USING AI AND MACHINE LEARNING

STATEMENT OF GOVERNMENT INTEREST

This invention was made with United States Government assistance under Contract No. DE-AC36-08GO28308 awarded by the National Renewable Energy Laboratory (NREL). The United States government has certain rights in this invention.

DESCRIPTION OF RELATED ART

Data center environments are often monitored by various systems to help ensure that the data center environment runs smoothly. For example, data center monitoring and diagnostic tools may be implemented that can identify non-responsive computing devices in the data center, such as CPU load, memory utilization, network input/output (I/O) parameters, and the like. The use of these parameters are often ineffective to identify degraded or degrading devices early enough such that corrective actions can be taken before the performance of the entire data center is affected. Moreover, these parameters alone are ineffective with respect to appropriate thresholds to be used in detection and classification of many forms of device degradation in the data center environment.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
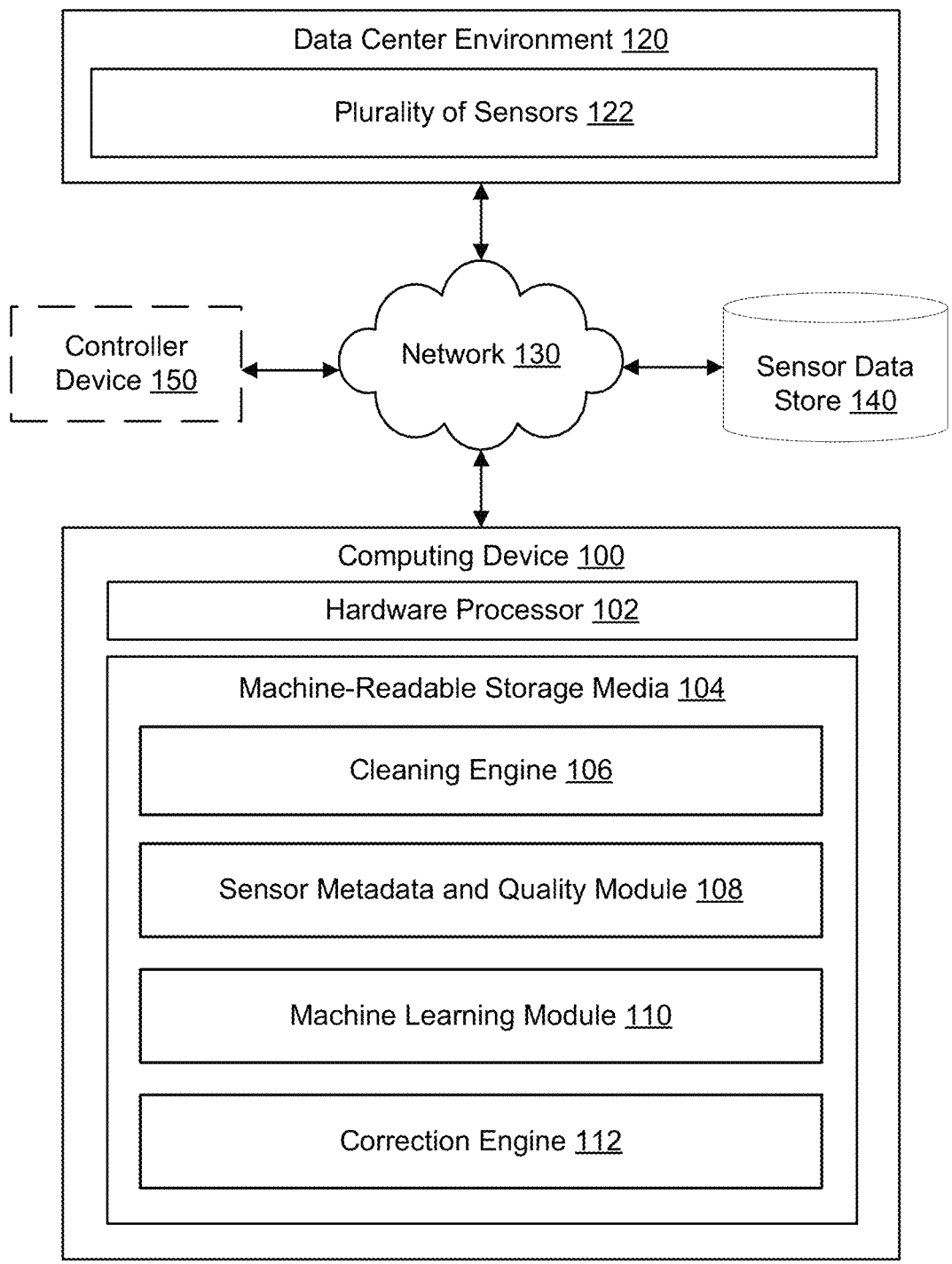
FIG. 1 provides illustrations of a data center environment and computing device for improving data monitoring and quality using AI and ML, in accordance with embodiments of the application.

The figures are not exhaustive and do not limit the present disclosure to the precise form disclosed.

DETAILED DESCRIPTION

A data center building may house a plurality of computing devices, sensors, and networking equipment, collectively referred to as a "data center." Hardware components (e.g., power control, logic, sensors, transducers, etc.) may be deployed in the data center to monitor the devices, nodes, sensors, and other characteristics of the data center environment (e.g., temperature inside the building, etc.) and generate millions of data points per second. Embodiments described herein can include a computing device to receive this data, analyze the data, and help to improve data monitoring and quality in the data center using artificial intelligence (AI) and machine learning (ML). For example, the AI/ML model executed by the computing device can clean the data stream and determine sensor correlation.

When determining sensor correlation, the computing device can compare the sensor locations with characteristics of the data stream that may be experiencing issues. If a threshold number of sensors are experiencing issues, the data center environment overall may be experiencing an issue rather than an individual sensor. This may help distinguish between issues with the data center environment overall and one or more sensors. For example, a data center environment-wide issue that affects multiple components at the same time may comprise a power failure, temperature above a threshold in the data center, and the like. Once the determination is made that the data center environment overall is not experiencing an issue, the individual computing devices, nodes, sensors, etc. may be analyzed to determine where the issue remains.

When the computing device determines that one or more individual sensors are experiencing an issue and not the data center overall, sensor data from the affected sensors can be analyzed. For example, historical data may be analyzed to help determine whether the sensor has a history of malfunction or reporting of incorrect sensor data. A history of malfunction or computing issues may be stored as a sensor quality range (e.g., 0-10, or high/medium/low, etc.) in the sensor data. The sensor data may also be identified as anomalous data generated by the sensor when the sensor data is out of range. The metadata may correspond with a value that defines a sensor quality of each of the plurality of sensors (e.g., the data range, etc.). The sensor data can include the sensor quality range for automatic and at-scale detection of sensor drift, drift out of calibration, drift out of an anticipated or historical range, anomalous data that identifies a sensor malfunctioning, etc. The AI/ML model executed by the computing device can automatically initiate a correction process for the sensor (e.g., recalibration on the fly, etc.) to improve future statistical and machine learning models that monitor the health of the data center environment.

The threshold value associated with a particular hardware component or an environment-wide issue that affects multiple components at the same time may be dynamic. For example, traditional data center management may use threshold values that are static or fixed. When sensors or devices change in the data center, the thresholds can be exceeded numerous times, even though nothing improper has happened in the data center. The false alarms may be raised for various reasons when the threshold values are static, including a sensor that may generate sensor data (e.g., temperature, etc.) that is always 5% higher than the actual data, when the sensor tracks a computing device that is purposely offline (e.g., to replace or upgrade the device), or other instances where the sensor may generate sensor noise rather than useful sensor data. This creates a plurality of false alarms that network administrators often ignore in traditional data center environments but that can result in a shutdown or malfunction of the traditional data center environment in situations where an alarm is not false, but the network administrator is lulled into complacency by receiving the plurality of false alarms. In various embodiments of the present disclosure, the ML models can dynamically calculate various threshold values for various systems in the data center environment. The dynamic threshold values may be based upon evolving ML models and evolving data from the data center environment. This can reduce false alarms.

The correction process of one or more sensors may be implemented in various ways. For example, a single, calibrated sensor can be used to correct other, uncalibrated sensors. In another example, two or more calibrated sensors may be used to correct other sensors that are out of a sensor data range, out of drift, malfunctioning, or out of calibration. In another example, a sensor may be factory calibrated (or calibrated by a human operator) and/or store individual calibration parameters in a sensor memory. The stored calibration parameters may be retrieved and used by machine readable instructions to recalibrate the sensor. Other correction processes are available as well, including ignoring or discarding sensor data generated by the malfunctioning sensor, check other equipment in the data center environment, or calibrate sensors that were previously calibrated but may have drifted over time, and the like.

Technical advantages are realized throughout the application. For example, incorrect measurements from a plurality of sensors can result in automated changes. The automated changes (e.g., adjusting sensor readings, adding a bias value, etc.) can improperly alter the plurality of sensors based on the incorrect data. This can increase computing inefficiencies and operating costs or result in interruption of service of the data center environment. These sensors, over time, can drift out of calibration and need to be removed from service and recalibrated. In some cases, the sensors may be sent to a calibration lab, and the entire process can take several weeks. In the case that the sensor is monitoring a critical piece of equipment, where N+1 sensor redundancy may be required at all times to comply with computing standards, it may be necessary to deploy N+2 sensors so that if a sensor is sent off for calibration, N+1 sensor redundancy may still be maintained. In traditional systems, the process of recalibrating a sensor can be onerous, and when thousands of sensors are deployed, keeping sensors in calibration can become time-consuming and expensive. In embodiments of the application, the system can conduct correlations between groupings of sensors and seek out trends that point to sensors that are drifting out of calibration using AI and ML models. The improved approach can be initiated automatically on each of the plurality of sensors in the data center environment.

FIG. 1 provides illustrations of a data center environment and computing device for improving data monitoring and quality using AI and ML, in accordance with embodiments of the application. Computing device 100 may comprise hardware processor 102 and machine-readable storage media 104, which is in communication with data center environment 120 via network 130. Machine-readable storage media 104 may comprise one or more engines and modules, including cleaning engine 106, sensor metadata and quality module 108, machine learning module 110, and correction module 112.

Hardware processor 102 may be one or more central processing units (CPUs), semiconductor-based microprocessors, and/or other hardware devices suitable for retrieval and execution of instructions stored in machine-readable storage medium 104. Hardware processor 102 may fetch, decode, and execute instructions, to control processes or operations for optimizing the system during run-time. As an alternative or in addition to retrieving and executing instructions, hardware processor 102 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 104, may be any electronic, magnetic, optical, or other physical storage device that contains or stores executable instructions. Thus, machine-readable storage medium 104 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 104 may be a non-transitory storage medium, where the term "non-transitory" does not encompass transitory propagating signals. As described in detail below, machine-readable storage medium 104 may be encoded with executable instructions for implementing the engines and modules described herein.

Cleaning engine 106 may identify any processes that have altered sensor data. This may include identifying a particular sensor where the sensor data has been identified as drifting over time and/or the sensor has been recalibrated. In some examples, cleaning engine 106 may identify whether the sensor has been initially calibrated (e.g., in a maintenance state, etc.) or not.

Cleaning engine 106 may identify the accuracy of incoming sensor data. For example, a measured temperature from the sensor (e.g., the sensor data) may satisfy an initial threshold range to comply with data accuracy standards. As an illustrative example, the initial threshold range may be 10-80 degrees Centigrade (e.g., or another temperature range that is possible in data center environment 120). When the received sensor data is outside this range, the sensor may be flagged for a correction process (via correction engine 112), the sensor may be identified as broken and needing to be removed from the environment, or the sensor data may be rejected without correction.

Cleaning engine 106 may identify an operational issue in the data center environment 120. For example, when the sensor data for the plurality of sensors 122 exceeds a threshold value (e.g., all sensors are calculating that the temperature of the data center is 20 degrees above normal, etc.), the data center environment may not be operational when compared to the threshold value (e.g., the normal temperature). In some examples, the operational issue may be determined by an external device (e.g., external to the computing device 100) and cleaning engine 106 may receive that notification. The data quality, machine learning, and individual sensor correction process may not be initiated when the data center environment is not operational above a threshold value. As discussed throughout the disclosure, the threshold value may be a dynamic threshold value determined by the ML model.

Cleaning engine 106 may initiate a data cleaning process on the sensor data when the sensor data is received. The data cleaning process may receive various types of data, including data streams, individual data packets or files, batched data, and the like. The data cleaning process may execute initial checks on the data and allow the data to proceed to the ML learning analysis, drift detection, and the like, as described throughout the disclosure. In some examples, the data cleaning process is continuous executed on the data according to a completion flag. For example, the data may be cleaned and the flag may be altered from uncleaned data to cleaned data.

Cleaning engine 106 may complete the data cleaning process when the completion flags corresponding with individual rows of data indicate that the data have been cleaned. The data cleaning process may periodically or continuously scan for new data with a completion flag corresponding to uncleaned data. In some cases, data may be accessible for processing by various analysis tools in the system and may be removed or independent of re-calibration procedures during the data cleaning process (e.g., the data from a particular source may not be sent to the recalibration procedure, etc.).

Sensor metadata and quality module 108 may receive sensor data from the plurality of sensors 122 in data center environment 120. The sensor data may comprise one or more of computing device performance metrics, environmental compute system metric (e.g., temperatures, water pressures, or water flow metrics), and/or facility related metrics (e.g., cooling system metrics and power distribution metrics).

The sensor data may comprise sensor metadata. Metadata may identify data readings from the sensor. The sensor data may be compared with a predetermined range (e.g., based on human intervention) or based on learning the metadata over time (e.g., by a machine learning model). For example, the sensor data may be identified as anomalous data generated by the first sensor when the sensor data is out of range. The metadata may correspond with a value that defines a sensor quality of each of the plurality of sensors (e.g., the data range, etc.).

In some examples, the sensor data may remain within a data range, but identified as anomalous in other ways, including based on an anomaly score generated as an output by the ML model. The anomalous data may indicate certain characteristics of sensors or measured attributes of the data center such as a sensor becoming uncalibrated, a sensor malfunctioning, etc. In another example, the sensor data may be identified by the ML model as producing frequency data that is unusual for the particular sensor.

The anomalous data can be removed in either the training or production processes of the ML model. In one example, the anomalous data may be removed if it is out of range by comparing the anomalous data to the metadata. This can be via an AI/ML model, or through a comparison process. This comparison approach may not identify all anomalous data, and the anomalous data may later be identified by the AI/ML models during the production (e.g., after the models are trained, etc.) and after the initial cleaning process.

In some examples, the ML model may enable anomalous behavior detection and a high level of resiliency despite the deployment of a fewer number of sensors. Sensor data corresponding to one or more sensors may be discarded from input to the ML model while still maintaining the capability to perform the desired anomalous behavior detection. In some examples, discarding sensor data may result from the corresponding sensor(s) no longer being deployed (e.g., the elimination of redundancy for one or more sensors). In other examples, sensor data for a particular sensor that is no longer deployed may simply be absent from the input. It should be appreciated that the discarding of sensor data is distinct from the loss of information that may occur as a result of encoding or cleaning the input.

In some examples, sensor data can be provided to a controller device 150 from the data center environment 120 via network 130. The controller device 150 may be incorporated with computing device 100 or data center environment 120, or may be a standalone device (e.g., with a processor, machine readable instructions, etc.). Controller device 150 may add the sensor metadata prior to the sensor data being transmitted to computing device 100. The sensor data with the sensor metadata may be received by computing device 100 to be analyzed (e.g., by cleaning engine 106).

Sensor data may compromise a correctness indicator. The correctness indicator corresponds with a read interval in which the sensor value may be changed. Some sensors values might need to change on every read to be considered correct where others could provide the same value multiple times before the sensor value is considered incorrect. This feature may assist in determining sensors that are not working, some sensors can deliver the last value even though they are broken.

Sensor data may comprise an accuracy value of the sensor. For example, this could be as simple as +/−5% of the full-scale reading (FS), or it could be more complex like, if current <1 A then sensor accuracy is 0.1 A+/−1% FS, if current >1 A then accuracy is +/−2% FS.

Sensor data may comprise a location of the sensor. The location may be a physical location in the data center environment and/or a device adjacent to the sensor.

Sensor metadata and quality module 108 may store sensor data and/or sensor metadata in sensor data store 140. The plurality of sensors 122 may generate the sensor data and computing device 100 may store the data in sensor data store 140. Sensor data may comprise sensor metadata, data trends, and/or correlations between multiple sensors. Sensor data store 140 may include a location of the sensor in the data center environment.

In some cases, sensors may be initially calibrated (e.g., prior to use in a data center environment) or recalibrated (e.g., after an initial use in the data center environment). The calibration of the sensor may correspond with the calibration parameters from one or more calibration certificates that show traceability back to National Institute of Standards and Technology (NIST) standards.

Sensor data store 140 may include historical sensor data. The historical sensor data may include stationary metrics and a corresponding timestamp where sets of correlated metrics have been computed. The continuous sensor data may correspond with continuous monitoring. The continuous monitoring process may be used to identify drifted sensors before they introduce significant damage to the system.

A measurement can be automatically validated, at least in part, by providing a valid value range during sensor registration. The sensor data range may include, for example, sensor drift, sensor out of calibration, or a sensor data value that is outside of a range of predetermined values. As an illustrative example, if the range of a temperature sensor X is defined as 0 to 100 F, then any measurement outside this range can be marked as invalid. The measurement outside the range can be stored in sensor data store 140. In some examples, a Boolean value may be stored instead of the measurement value (e.g., calibrated/not calibrated, valid/invalid, etc.).

In some examples, sensor metadata and quality module 108 may execute drift detection and/or drift compensation. In drift detection, sensor metadata and quality module 108 may exploit redundancy by identifying two or more duplicate, deployed sensors. Sensor metadata and quality module 108 may compute the difference between sensor measurements and generate a drift detection alert when the difference exceeds a predefined threshold. The drift detection alert may identify that one or both of the sensors are bad, since the sensor readings from the redundant, deployed sensors should be equal.

In some examples, sensor metadata and quality module 108 may execute drift detection absent redundant sensors in the data center environment 120 by using sensor metadata. Additional examples are provided herein and further illustrated with FIG. 3.

In drift detection, sensor metadata and quality module 108 may detect a change in data distribution. For example, if a measured quantity is stationary, a change in appropriate statistics over a long window indicates a drift. For instance, if the generated data is represented by a Gaussian distribution with parameters $N(\mu_{true}, \sigma_{true})$, the following rule may trigger a drift detection alert:

$|\mu_e - \mu_a| > D_\mu$ OR $|\sigma_e - \sigma_a| > D_\sigma$, where e and m are expected and actual statistics computed over a long window of measurements, and D is the threshold. Advanced implementation may use multiple statistics for different regimes of operations. Different statistics can be maintained for working and non-working hours for sensors deployed at a manufacturing facility.

In some examples, a drift detection alert may trigger the recalibration models to start to automatically recompute calibration parameters. Results may be immediately available for single metrics. For some sets of correlated metrics, operator intervention may be required to determine which sensor has drifted from its expected behavior. For some sets of correlated metrics, an ML model may determine which sensor(s) is(are) faulty using root-cause analysis (e.g., correlating events with the root cause of the faulty sensor, establishing a causal graph between the root cause and the resulting faulty sensor, etc.). In some examples, the recalibration parameters may be generated on a regular basis, or during shutdown or routine maintenance checks. A series of scenarios may put the sensor into predefined or known states with known operational characteristics. Sensor metadata and quality module 108 may verify that the sensors are calibrated and produce expected measurements.

In drift compensation, sensor metadata and quality module 108 may exploit redundancy by identifying two or more duplicate, deployed sensors. One of the two or more duplicate, deployed sensors may be determined to be the sensor that is faulty. Sensor metadata and quality module 108 may compute the difference between sensor measurements (e.g., the faulty sensor and one or more not-faulty sensors, etc.) and a drift detection alert may be issued when the difference exceeds a predefined threshold. In some examples, given a set of redundant sensors that measure the same quantity, sensor metadata and quality module 108 (or correction module 112) may remove the one or more sensors that have drifted and use the remaining sensors to calculate an average measurement.

Sensor metadata and quality module 108 may generate one or more graphs of sensors. For example, sensor metadata and quality module 108 may use the graph to validate the quality of the sensor (e.g., using a corresponding device and location data, etc.). As an illustrative example, if water flows from A to B, passing sensors S1, S2, and S3 along the way while cooling different devices, and heat is being added continuously along the path from S1 to S3, then the temperature at S1 is cooler than at S2 which is cooler than at S3. If the measurement of S3 shows a lower temperature than S1, then something may be wrong with either the system overall or a particular sensor along the path.

Sensor metadata and quality module 108 may combine sensor data with the location information of a device, or other information in the data store. The combination of the data can be used to generate the connected graphs of sensors. An illustrative example of a connected graph of sensors is provided herein and further illustrated with FIG. 4.

Figure 2:
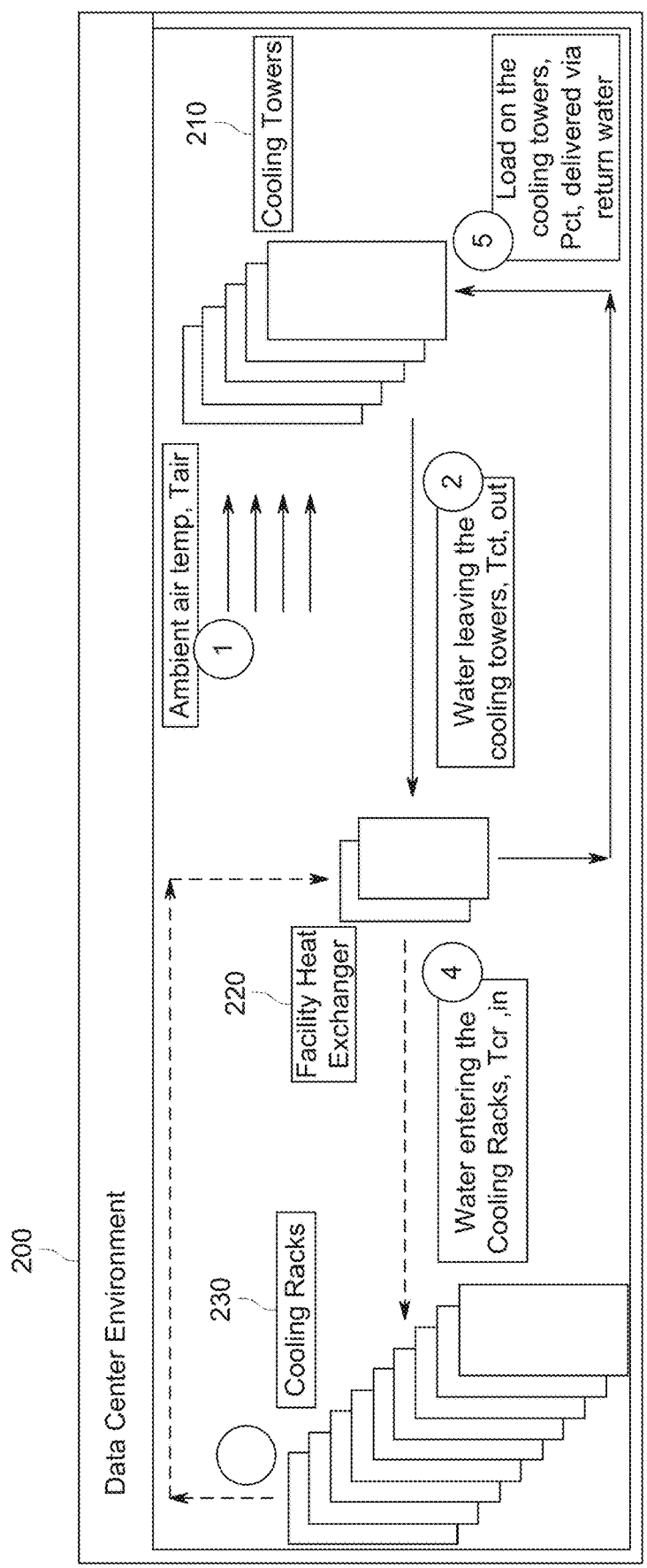
FIG. 2 is an illustration of a data center environment, in accordance with embodiments of the application.

Sensor metadata and quality module 108 may determine correlated sensors. For example, domain knowledge may be used to determine one or more correlated sensors (e.g., based on location of the sensors, based on the same type of sensor that is implemented in the environment 120, etc.). In another example, historical data from sensor data store 140 may be used to automatically determine correlated sensors (e.g., similar spikes or drops in temperature data, similar data patterns per time frame, etc.). In yet another example, correlated sensors may be co-located at a device in the data center environment 120. In yet another example, correlated sensors are determined as illustrated in FIG. 2.

The connected graphs of sensors may be used to automatically learn more meaningful and interpretable sets of correlated sensors in addition to location of the sensors. In some examples, the system may implement Spectral Graph Partitioning or Spectral Clustering. In other example, the system may be coupled with visual analytics tools for identifying spatio-temporal correlations. In yet another example, the same can be achieved with Graph Heat Diffusion models.

Machine learning module 110 may implement AI/ML to learn the behavior of one or more particular sensors. For example, by combining the learned sensor behavior with a predefined value range, the combination may identify values outside the interval 20 to 50F are already in doubt. Sensor data store 140 may also be used to identify sensors with similar behavior (e.g., similar sensor data for the particular data range, etc.). The identification of the similar sensors may be used to improve statistical and ML models by combining data from each sensor to a common sensor classification.

Machine learning module 110 may execute ML model-based detection (e.g., during drift detection). For example, an ML model M may be built for a particular sensor. If sensor data is represented by a stationary distribution, the accuracy of an ML model may be in a dynamic sensor range given a large enough data sample. A difference that exceeds the dynamic threshold value between expected and actual model accuracy, computed over a large time window, may indicate a sensor drift.

In some examples, the ML model may be trained on a dataset that contains few or no anomalous data points. Thus, the ML model may learn to reconstruct sensor data and/or dynamic threshold values associated with normal operational behavior of the data center environment.

Machine learning module 110 may execute a Machine Learning (ML) model to model sensor drift (e.g., during drift compensation). For instance, measurements of a gas sensor may linearly depend on the ambient temperature:

$M_{gas} = w_o + w_1 T$, where $M_{gas}$ is the actual gas sensor measurement (uncalibrated), T is the temperature and $[w_o, w_1]$ is the vector of model parameters. If the same measurement is done multiple times, for the same temperature range, and the sensor reports the same data, then sensor drift has not occurred. The calibrated value then can be obtained using:

$M_{calibrated-gas} = M_{gas} - b(T - T_c)$, where $T_c$ if the temperature at which the sensor was calibrated, and b is the slope of the curve.

Machine learning module 110 may execute the ML model to compensate for sensor drift (e.g., during drift compensation) and correction module 112 may deploy redundant sensors. As discussed, the outputs of sensors may drift from the expected values (e.g., due to environmental conditions like radiation, humidity, elevation, location, etc.). The reported values may not be in line with an expected value. For example, if the humidity is actually at 90%, an operator knows it is humid, and the sensor reports 20% humidity, then this is a deviation from a higher value expected by the operator.

A solution for the drift may be to deploy a low cost sensor together with an expensive sensor (e.g., advanced measurement station) and collect measurements of both devices together with the environmental conditions. As an example of using a low cost sensor and an expensive sensor (e.g., for a critical device, where N+1 redundancy is required, etc.), the system may deploy N+2 in case the redundant sensor fails (as described in earlier examples). Instead of using three calibrated sensors, the system may use one, expensive, calibrated sensor and two, inexpensive, uncalibrated sensors. Once deployed, the uncalibrated sensors may be calibrated using the calibrated sensors. If the calibrated sensor fails, the system may rely on the remaining two calibrated sensors until an operator can replace the failed, expensive, calibrated sensor. Once the calibrated sensor is redeployed, the other two sensors may also be recalibrated.

In some examples, once correction module 112 has deployed the redundant sensors, machine learning module 110 may build a ML model for a low cost device that produces uncalibrated measurements. This model takes uncalibrated measurements of low cost device and current environment parameters, and learns to predict what an expensive device would produce in similar conditions:

$\text{Measurement}_{calibrated} = \text{Model.predict}(\text{Measurement}_{uncalibrated}, \text{EnvironmentParams})$ Correction module 112 may identify the sensor that is providing incorrect sensor data (e.g., outside of the data range, etc.) and generate/transmit an alert notification about the particular sensor to a third party. Sensor data may be included with the alert, including location or sensor type, or other details about the poor data quality of the sensor. Additional information may identify other sensors that are correlated with the sensor that provides the inaccurate sensor data and inform the third party how inaccurate the sensor data is when compared to the other, correlated sensors.

Correction module 112 may remove the data associated with the sensor from analysis. For example, the future sensor data that is generated by the inaccurate sensor may be flagged and/or removed from further analysis until some action occurs. In some examples, the future sensor data may be removed from recalibration of the machine learning model (e.g., to keep the ML model trained on accurate sensor data, etc.).

Correction module 112 may perform sensor calibration of the plurality of sensors 122 to help standardize sensor data through a correction process. The sensor calibration can help prevent or correct any incorrect measurements from the plurality of sensors 122. In some examples, the recalibration may be automatic and/or verified through the correction process. The correction process may be performed when the system is in a known state (e.g., during a maintenance phase, etc.).

Assuming that all the sensors in a data center environment are calibrated, then putting the system in a deterministic state may allow the monitoring performed by computing device 100 to store a baseline of the sensors. The baseline of the sensors may be stored in sensor data store 140.

During periodic maintenance windows, the system can be set back into the same state where the baseline measurements were taken. As an illustrative example, sensor metadata and quality module 108 can compare current measurements with the baseline data and correction module 112 can recalibrate sensors on the fly. For example at the outset, if sensor 1 showed a difference of 2 degrees relative to correlated sensors 2 and 3 in the baseline, and now shows 4 degrees difference, its calibration can be adjusted to, for example, a subtraction of 2 degrees from each of its measurements. Similarly, more complex adjustments between groups of sensors can be accomplished.

In some examples, during the baseline measurements, a flow meter sensor calculates a zero flow (e.g., if the system pump is not running in the baseline state, etc.). If the flow meter shows any other value other than zero at subsequent baseline states, it could either indicate a drift of its calibration or some change in the baseline state. If the correlated pump is still off, then the flow meter can be recalibrated by correction module 112. If the pump is on, then a more thorough investigation can be initiated by correction module 112.

In some examples, both uncalibrated and calibrated sensors are used in a data center environment. Using the baseline state and sensor location graphs can reduce the measurement error introduced by the uncalibrated sensors. For example, if an uncalibrated sensor 1 should measure the same temperature as a calibrated sensor 2, its measurement value can be adjusted by correction module 112. In some examples, measurement value correlations can be used to provide software calibration of the sensor.

In some examples, the system may use only uncalibrated sensors and/or a cluster of sensors can be adjusted. The adjustments can be implemented according to the sensor graph (e.g., location, etc.) and deterministic system behavior in the baseline state. A simple example would be a state where all nodes are powered off. All temperature sensors in one cooling loop should measure the same temperature after a defined period (e.g., overnight, etc.). With historical data collected during all baseline periods it may be possible to calibrate the system sensors over time. For example, a node's power consumption is directly converted into heat. In some examples, all sensors measuring the heat transfer from a node may be able to sum up to the node power consumption.

Data center environment 120 may comprise a plurality of sensors 122. Additional detail associated with data center environment 120 is provided with FIG. 2.

FIG. 2 is an illustration of a data center environment, in accordance with embodiments of the application. Data center environment 200 may comprise air and water flowing through, for example, one or more cooling towers 210, one or more facility heat exchangers 220, and one or more cooling racks 230.

The data center environment may include a High Performance Computing (HPC) data center that may rely on instrumentation in order to maintain acceptable data center uptime. The acceptable data center uptime may correspond with a contractual document, predetermined values, or other metrics such as Quality of Service (QoS) or Service Level Agreement (SLA). These metrics may dictate that a data center cannot be down for more than X hours per year, for example.

One type of cooling tower 210, for example an evaporative cooling tower, may comprise one or more heat exchangers in which air and water are brought into direct contact with each other in order to reduce the water's temperature via evaporative cooling. As this occurs, a small volume of water may evaporate and the temperature of the water being circulated through the tower may be reduced. The water may be pumped in to cooling towers 210 after the water has been heated in other areas of the data center environment 200. As the water flows through cooling towers 210, it is exposed to air, which is being pulled through the cooling towers 210

(e.g., by an electric motor-driven fan). The cooled water may be then pumped back to one or more facility heat exchangers 220, which is sent to one or more cooling racks 230.

The temperature of the water in cooling tower 210 may vary seasonally. For example, the maximum temperature of water output by cooling tower 210 in the summer may be greater than the water output by cooling tower 210 in the winter, based on external temperatures experienced by the data center environment overall. The machine learning (ML) model for sensors related to cooling tower 210 may identify the seasonality changes in the temperature data and adjust the dynamic threshold value associated with these sensors based in part on the seasonally-adjusted temperatures.

Cooling racks 230 may consist of an air-to-liquid heat exchanger, over which air is blown. Facility water may be pumped through the cooling rack, which runs through the heat exchanger 220. In one implementation, the cooling rack 230 is placed in between 4 information technology (IT) racks (e.g., 2 on each side), with the cold aisle and hot aisle of the cooling rack and IT racks contained. The hot air from the IT racks may pass through the cooling rack and may be cooled and returned to the IT racks to cool their electronics.

The one or more facility heat exchangers 220 may be stand-alone and/or may be part of the facility (e.g., not part of any cooling rack 230).

The plurality of sensors 122 may be incorporated with each of these devices, including one or more cooling towers 210, one or more facility heat exchangers 220, and one or more cooling racks 230, to help control the devices. The plurality of sensors 122 may comprise thermocouples, pressure sensors, flow meters, power meters, relative humidity sensors, etc.

Correlations between multiple sensors, also known as multivariate sensor correlations, can quantify whether sensors are drifting out of calibration, range, and/or malfunctioning. In some examples, the sensor data range is determined using the multivariate sensor correlations to quantify drift of a particular sensor to a single calibrated sensor.

At block 1, the ambient air (Tair) may be received in cooling towers 210. The cooling tower 210 may include an evaporative cooling tower (described above), a dry cooler embodiment of the cooling tower 210, or other cooling towers described in the art.

At block 2, the water leaves cooling towers 210 at a temperature Tct,out. The water is delivered to the facility heat exchangers 220.

At block 3, the hot water returning from the cooling racks 230 is cooled by the facility heat exchangers 220.

At block 4, the water leaving the facility heat exchangers 220, at a temperature Tcr,in, is delivered to the inlets of each of the cooling racks 230. In some examples, the cooling water is delivered to each of the cooling racks 230 in parallel. This may cause the temperature Tcr,in delivered to each cooling rack 230 to essentially be the same.

At block 5, the ambient air (Tair), cools the water leaving the heat exchangers 220 and flowing to the cooling towers 210, thereby removing the load Pct delivered from the data center's IT racks (cooled by cooling racks 230).

All of the metrics listed, i.e., Tair, Pct, Tct,out, and Tcr,in, provide an example of a subset of metrics that are all highly correlated to each other. For example, a rise in Tcr,in is highly correlated to Tct,out, which is highly correlated to Tair, and so on. Other metrics (e.g., flow rate of the coolant in between cooling towers 210 and facility heat exchanger 220) may also be correlated. The sensors that determine these metrics (e.g., the first subset and the second subset, etc.) may comprise non-overlapping sensors. If, for example, there is a rise in Tcr,in for a single cooling rack 230, without a commensurate rise in Tcr,in for all the other cooling racks 230, or even of Tct,out, this could point to an issue with the sensor reporting Tcr,in for the cooling rack 230 in question. Such a scenario is highlighted by FIG. 3.

Figure 3:
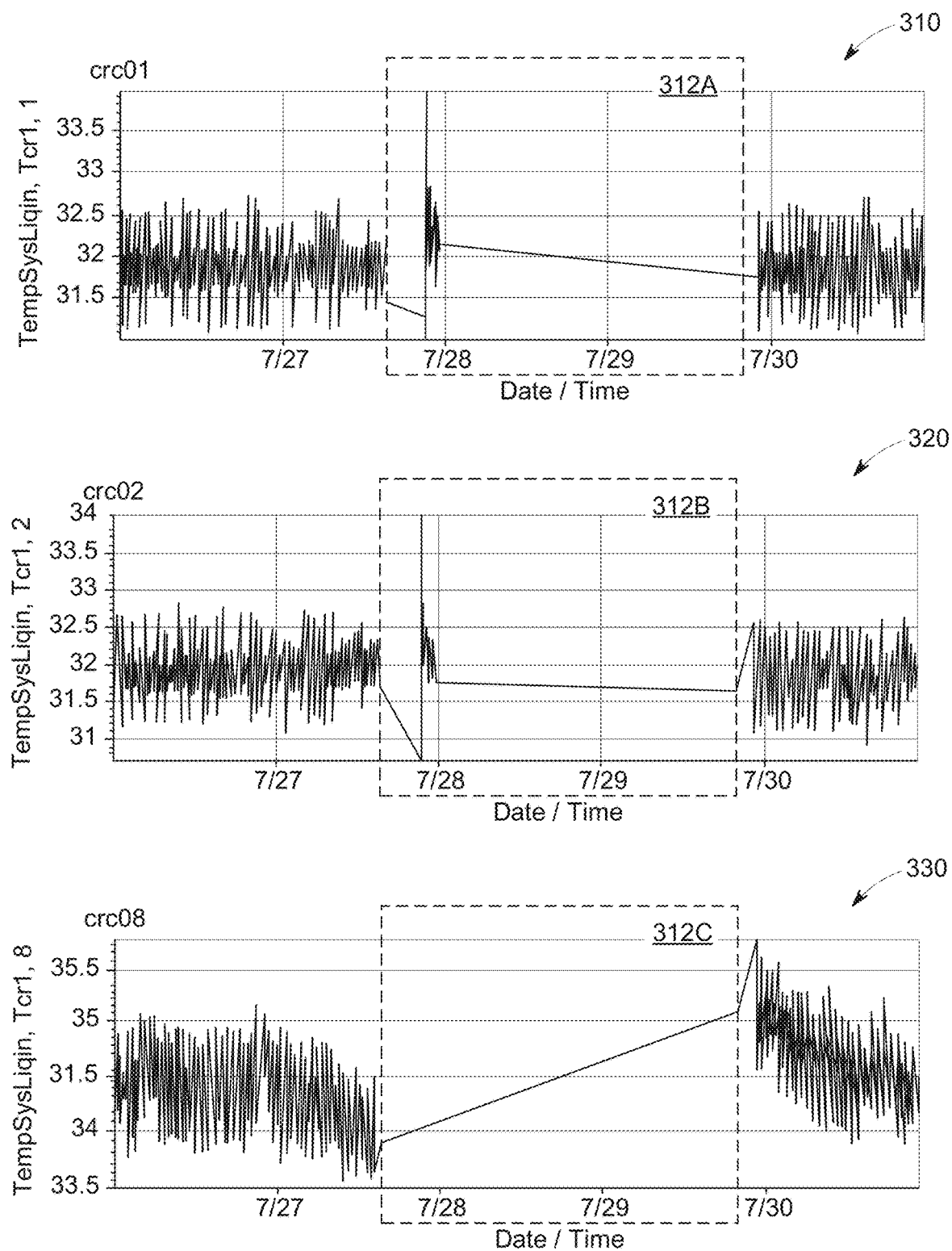
FIG. 3 are illustrative temperatures of cooling water flowing into a plurality of cooling racks in the data center environment, in accordance with embodiments of the application.

FIG. 3 shows illustrative temperatures of cooling water flowing in parallel into a plurality of cooling racks in the data center environment, in accordance with embodiments of the application. For example, a first sensor of the plurality of sensors 122 may generate the first plurality of sensor data 310, a second sensor of the plurality of sensors 122 may generate the second plurality of sensor data 320, and a third sensor of the plurality of sensors 122 may generate the third plurality of sensor data 330.

As illustrated, each of the sensors experienced missing sensor data 312 (illustrated as 312A for the first sensor, 312B for the second sensor, 312C for the third sensor). The missing sensor data 312 may identify an issue with the data center environment overall where the data center was not operational above a threshold value (e.g., data center or hardware device is turned off, data center is in a maintenance state and not producing sensor readings, etc.). Any sensor data corresponding with the operational issue may be removed from the sensor analysis.

When the data center environment is operational above the threshold value (e.g., a dynamic threshold value, etc.), the sensor data may be analyzed to determine sensor quality and/or whether a correction process should be implemented on one or more sensors. For example, the three sensor data illustrated in FIG. 3 may correspond with correlated sensors. When each of the sensors are fully operational, the water temperature for these correlated sensors may be similar for each corresponding time frame. However, the water temperature Tcr8,in, illustrated by 330, is different at time periods before and after the missing sensor data 312. Particularly, when comparing the water temperature Tcr8,in, with the other water temperatures from other sensors, the sensor data may be ~2 C higher than that of Tcr1, which is illustrated by 310, and Tcr2,in, illustrated by 320, even though they are all being supplied with cooling water at the same temperature. A correction process may be initiated for the sensor corresponding with the third plurality of sensor data 330.

Figure 4:
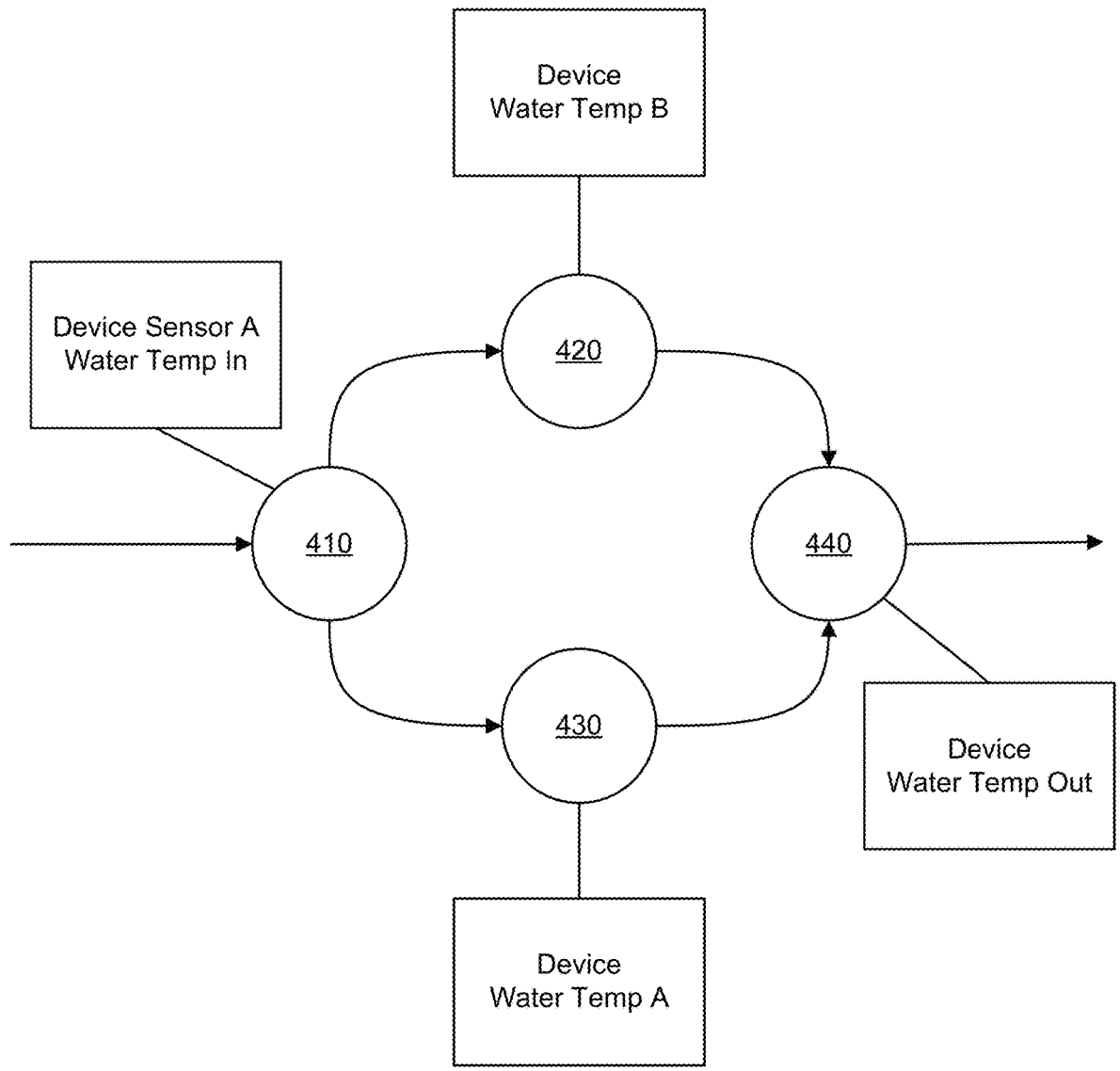
FIG. 4 is an illustrative connected graphs of sensors, in accordance with embodiments of the application.

FIG. 4 is an illustrative connected graphs of sensors, in accordance with embodiments of the application. Four sensors of a plurality of sensors in a data center environment are illustrated in a dependency graph, including first sensor 410, second sensor 420, third sensor 430, and fourth sensor 440. In some examples, each of these sensor may be the same type of sensor, although they may be different sensors without diverting from the scope of the disclosure. The connected graphs of sensors may be computer-generated (e.g., using graphing software, etc.) by an administrative user and/or domain expert with knowledge of the physical locations of devices and/or sensors in the data center environment.

Water may enter a water circuit in the data center environment at device sensor A corresponding with first sensor 410. The water circuit may split the water flow into two paths, including a first route to device water temperature B corresponding with second sensor 420 or a second route to device water temperature A corresponding with third sensor 430. The water may also be diverted to other devices and/or sensors that are not shown in the illustration. The water circuits along the first route and the second route may be rejoined in one pipe and exit the water circuit through device water temperature out corresponding with fourth sensor 440.

One or more assumptions may be determined based on the connected graph of sensors and/or dependency graph. For example, an assumption may be made that the water temperature increases as the water moves through the water circuit, or from left to right corresponding with the devices and/or sensors in the graph. In other words, the temperature of the water that enters first sensor 410 may be lower than the temperature of the water that enters second sensor 420 and third sensor 430. Both of these temperatures corresponding with second sensor 420 and third sensor 430 may be lower than the temperature of the water that enters fourth sensor 440. The temperature of the water that enters fourth sensor 440 may be the highest temperature in the illustrated water circuit.

One or more outlier detection sensors may be implemented in accordance with the graph based on the assumptions. For example, a sensor may be implemented with the water circuit to compare the water temperatures corresponding with first sensor 410 and fourth sensor 440. When the temperature at first sensor 410 is greater than the temperature at fourth sensor 440 (e.g., a minimum/maximum range, or some other threshold value difference between the water temperatures corresponding with first sensor 410 and fourth sensor 440, etc.), one or both of these sensors may be identified as an outlier and/or a correction process may be initiated for one or both sensors since the comparison does not correspond with the assumptions made about the water flowing through the water circuit.

In some examples, no heat is flowing into the system (e.g., the information technology (IT) racks may be turned off, etc.) and it may be possible that the water temperature at first sensor 410 reads only slightly higher than that at fourth sensor 440. This case may be applicable, for example, in an autonomous data center where there is minimal human input. In the non-autonomous data center, something like this could be overridden.

In another illustrative example, a cooling substance (e.g., water, etc.) may be incorporated in the data center environment and incorporated with the graph. The estimated temperature decrease attributed to the cooling substance may be incorporated with the calculation of water temperature in the graph.

In another illustrative example, a power consumption sensor may be incorporated in the data center environment and incorporated with the graph. An equation between the water temperature sensors, flow detection sensors, and power consumption sensors may be determined, for example, to identify the correlation between the power, temperature, and flow rate through a cooling water circuit.

In some examples, the connected graph of sensors may be weighted. For example, the value corresponding with one or more paths between sensors may be adjusted (e.g., with a constant or multiplier, etc.) to apply a weight to the path that is different than the value measured by the sensor.

In some examples, a plurality of connected graphs of sensors may be stored in the system. For example, a particular sensor may be identified in more than one graph (e.g., a first graph to show a relationship with a first subset of sensors and a second graph to show a relationship with a second subset of sensors, etc.). Each sensor may be identified in more than one graph.

In some examples, an administrative user and/or domain expert may generate different connected graphs of sensors. In some examples, the administrative user and/or domain expert may generate different weights between other graphs showing the sensors in the connected graph. In some examples, a machine learning (ML) model may generate different weights between other graphs showing the sensors in the connected graph.

Figure 5:
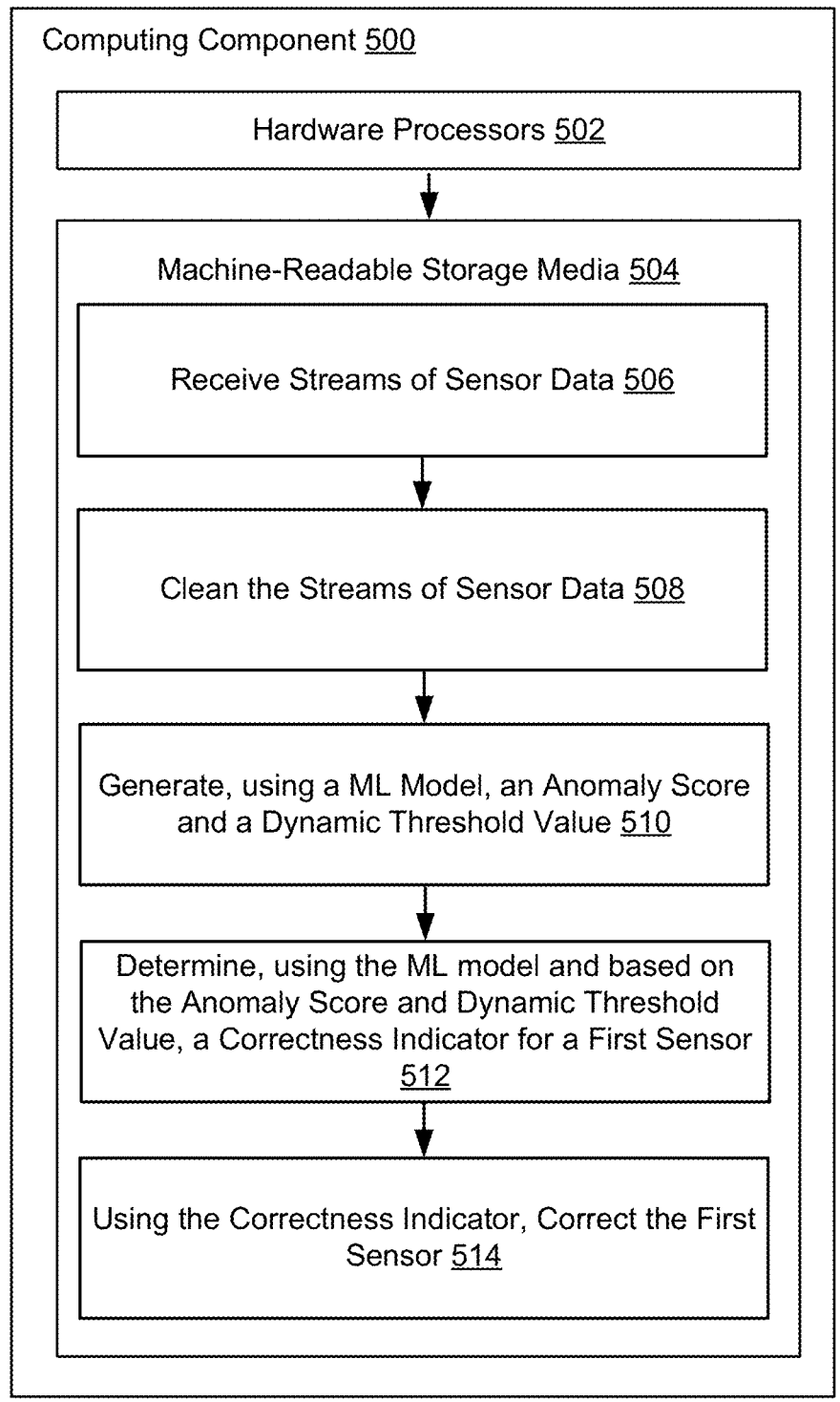
FIG. 5 illustrates a computing component for improving data monitoring and quality using AI and ML, in accordance with embodiments of the application.

FIG. 5 illustrates an example iterative process performed by a computing component 500 for improving data monitoring and quality using AI and ML. Computing component 500 may be, for example, a server computer, a controller, or any other similar computing component capable of processing data. In the example implementation of FIG. 5, the computing component 500 includes a hardware processor 502, and machine-readable storage medium 504. In some embodiments, computing component 500 may be an embodiment of a system corresponding with computing device 100 of FIG. 1.

Hardware processor 502 and machine-readable storage media 504 may be similar to the hardware processor 102 and machine-readable storage media 104 illustrated with FIG. 1.

Hardware processor 502 may execute instruction 506 to receive streams of sensor data from a plurality of sensors in a data center.

Hardware processor 502 may execute instruction 508 to clean the streams of sensor data. Cleaning the data may include initiating a data cleaning process.

Hardware processor 502 may execute instruction 510 to generate an anomaly score and a dynamic threshold value based on the cleaned streams of sensor data. In some examples, the anomaly score and the dynamic threshold value may be generated using an machine learning (ML) model. The sensor data may be provided as input to the ML model.

Hardware processor 502 may execute instruction 512 to determine a correctness indicator for a first sensor in the plurality of sensors. For example, the correctness indicator may be determined using the ML model and based on the anomaly score and the dynamic threshold value.

Hardware processor 502 may execute instruction 514 to correct the first sensor using the correctness indicator. The correction of the first sensor may be implemented using a correction process on the first sensor.

In some examples, the sensor data and correctness indicators comprise metadata of a sensor quality of each of the plurality of sensors.

In some examples, the sensor data comprises temperatures, water pressures, or water flow metrics.

In some examples, the sensor data comprises a computing device performance metric, an environmental compute system metric, and a facility related metric.

In some examples, a first subset of the plurality of sensors comprise highly correlated sensors that are related to a first component of the data center, a second subset of the plurality of sensors comprise highly correlated sensors that are related to a second component of the data center, and the first subset and the second subset comprise non-overlapping subsets of sensors.

In some examples, the correction process of the first sensor is initiated while the first sensor is in a maintenance state.

In some examples, the correction process of the first sensor is a recalibration of the first sensor.

Figure 6:
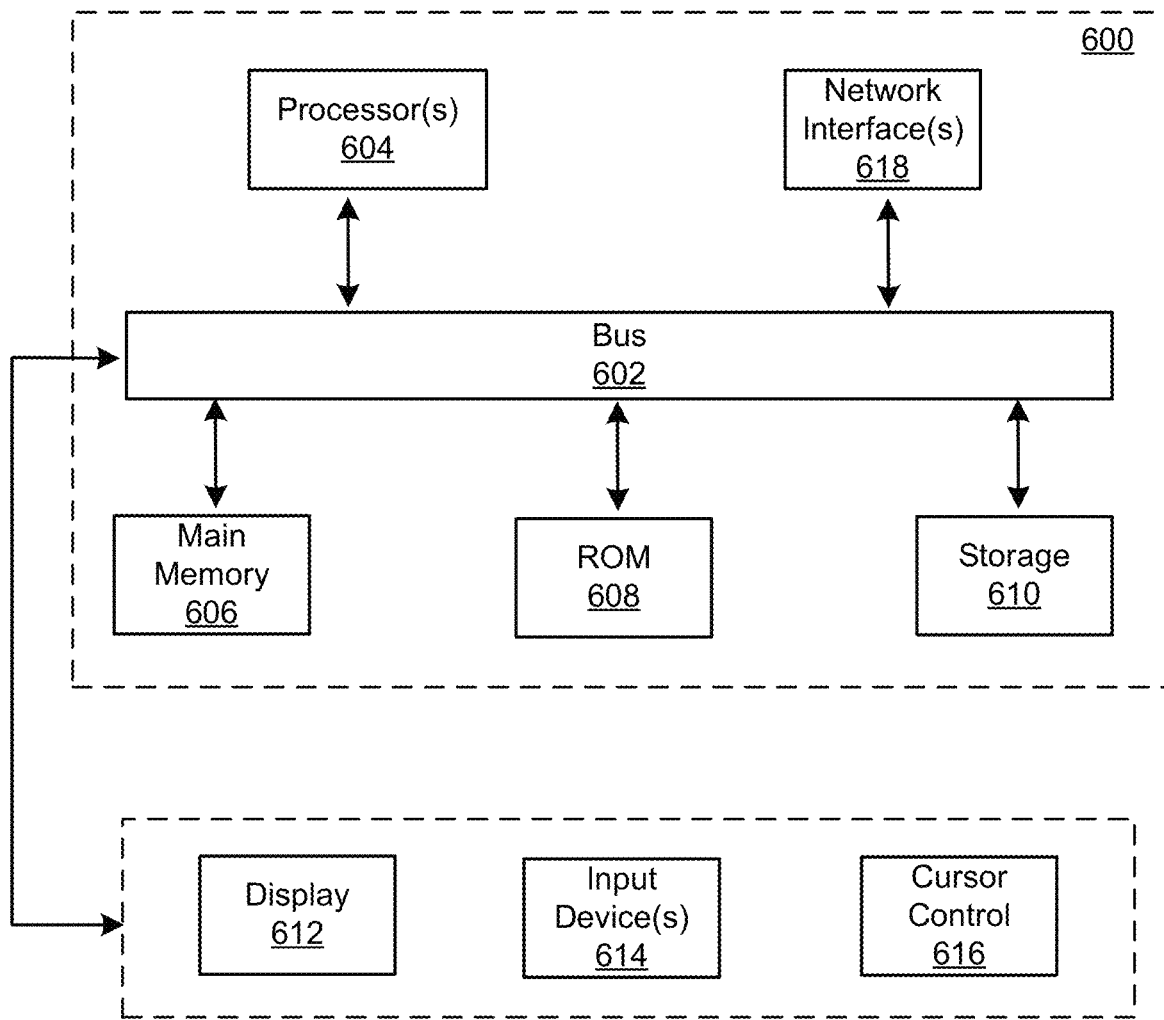
FIG. 6 is an example computing component that may be used to implement various features of embodiments described in the present disclosure.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing device comprising:
   a non-transitory memory; and
   one or more processors that are configured to execute machine readable instructions stored in the non-transitory memory for causing the one or more processors to:
      receive streams of sensor data from a plurality of sensors in a data center;
      for an incoming stream of sensor data from the streams of sensor data, determine that a first sensor in the plurality of sensors that generated the incoming stream of sensor data has been recalibrated since a previous stream was received;
      initiate a correction process of the incoming stream of sensor data to generate a cleaned stream of sensor data;
      generate, using a machine learning (ML) model, an anomaly score and a dynamic threshold value, the dynamic threshold value being compared to the cleaned stream of sensor data in detecting anomalous data generated by the plurality of sensors, and the anomaly score comprising data that indicates characteristics of the plurality of sensors or measured attributes of the data center;
      determine, using the ML model and based on the anomaly score and the dynamic threshold value, a correctness indicator for a first sensor in the plurality of sensors;
      identifying seasonality changes in temperature data of the data center;
      adjusting, using the ML model, the dynamic threshold value associated with the seasonality changes, wherein adjusting the dynamic threshold value also adjusts the correctness indicator for the first sensor in the plurality of sensors; and
      using the correctness indicator, correct the first sensor.

2. The computing device of claim 1, wherein one or more of the streams of sensor data comprises temperatures, water pressures, or water flow metrics.

3. The computing device of claim 1, wherein the streams of sensor data comprise a computing device performance metric, an environmental compute system metric, and a facility related metric.

4. The computing device of claim 1, wherein a first subset of the plurality of sensors comprise highly correlated sensors that are related to a first component of the data center, wherein a second subset of the plurality of sensors comprise highly correlated sensors that are related to a second component of the data center, and wherein the first subset and the second subset comprise non-overlapping subsets of sensors.

5. The computing device of claim 1, wherein the correction process of the first sensor is initiated while the first sensor is in a maintenance state.

6. The computing device of claim 1, wherein the correction process of the first sensor is a recalibration of the first sensor.

7. The computing device of claim 1, wherein the correction process deploys a redundant sensor with the first sensor to generate second sensor data together with the incoming stream of sensor data.

8. The computing device of claim 1, wherein the correctness indicator corresponds with a read interval in which the incoming stream of sensor data is changing.

9. A computer-implemented method comprising:
   receiving streams of sensor data from a plurality of sensors in a data center;
   for an incoming stream of sensor data from the streams of sensor data, determining that a first sensor in the plurality of sensors that generated the incoming stream of sensor data has been recalibrated since a previous stream was received;
   initiating a correction process of the incoming stream of sensor data to generate a cleaned stream of sensor data;
   generating, using a machine learning (ML) model, an anomaly score and a dynamic threshold value, the dynamic threshold value being compared to the cleaned stream of sensor data in detecting anomalous data generated by the plurality of sensors, and the anomaly score comprising data that indicates characteristics of the plurality of sensors or measured attributes of the data center;
   determining, using the ML model and based on the anomaly score and the dynamic threshold value, a correctness indicator for a first sensor in the plurality of sensors;
   identifying seasonality changes in temperature data of the data center;
   adjusting, using the ML model, the dynamic threshold value associated with the seasonality changes, wherein adjusting the dynamic threshold value also adjusts the correctness indicator for the first sensor in the plurality of sensors; and
   using the correctness indicator, correct the first sensor.

10. The method of claim 9, wherein the streams of sensor data and correctness indicators comprise metadata defining a sensor quality of each of the plurality of sensors.

11. The method of claim 9, wherein one or more of the streams of sensor data comprises temperatures, water pressures, or water flow metrics.

12. The method of claim 9, wherein the streams of sensor data comprise a computing device performance metric, an environmental compute system metric, and a facility related metric.

13. The method of claim 9, wherein a first subset of the plurality of sensors comprise highly correlated sensors that are related to a first component of the data center, wherein a second subset of the plurality of sensors comprise highly correlated sensors that are related to a second component of the data center, and wherein the first subset and the second subset comprise non-overlapping subsets of sensors.

14. The method of claim 9, wherein the correction process of the first sensor is initiated while the first sensor is in a maintenance state.

15. The method of claim 9, wherein the correction process of the first sensor is a recalibration of the first sensor.

16. A non-transitory computer-readable storage medium storing a plurality of instructions executable by one or more processors, the plurality of instructions when executed by the one or more processors cause the one or more processors to:
   receive streams of sensor data from a plurality of sensors in a data center;
   for an incoming stream of sensor data from the streams of sensor data, determine that a first sensor in the plurality of sensors that generated the incoming stream of sensor data has been recalibrated since a previous stream was received;
   initiate a correction process of the incoming stream of sensor data to generate a cleaned the streams of sensor data;
   generate, using a machine learning (ML) model, an anomaly score and a dynamic threshold value, the dynamic threshold value being compared to the cleaned stream of sensor data in detecting anomalous data generated by the plurality of sensors, and the anomaly score comprising data that indicates characteristics of the plurality of sensors or measured attributes of the data center;
   determine, using the ML model and based on the anomaly score and the dynamic threshold value, a correctness indicator for a first sensor in the plurality of sensors;
   identify seasonality changes in temperature data of the data center;
   adjust, using the ML model, the dynamic threshold value associated with the seasonality changes, wherein adjusting the dynamic threshold value also adjusts the correctness indicator for the first sensor in the plurality of sensors; and
   using the correctness indicator, correct the first sensor.

17. The computer-readable storage medium of claim 16, wherein the streams of sensor data and correctness indicators comprise metadata of a sensor quality of each of the plurality of sensors.

18. The computer-readable storage medium of claim 16, wherein one or more of the streams sensor data comprises temperatures, water pressures, or water flow metrics.

19. The computer-readable storage medium of claim 16, wherein the streams of sensor data comprise a computing device performance metric, an environmental compute system metric, and a facility related metric.

20. The computer-readable storage medium of claim 16, wherein a first subset of the plurality of sensors comprise highly correlated sensors that are related to a first component of the data center, wherein a second subset of the plurality of sensors comprise highly correlated sensors that are related to a second component of the data center, and wherein the first subset and the second subset comprise non-overlapping subsets of sensors.

21. The computer-readable storage medium of claim 16, wherein the correction process of the first sensor is initiated while the first sensor is in a maintenance state.

* * * * *